US009594790B2

(12) United States Patent
Fuchs et al.

(10) Patent No.: US 9,594,790 B2
(45) Date of Patent: Mar. 14, 2017

(54) SYSTEM AND METHOD FOR EVALUATING CLAIMS TO UPDATE A RECORD FROM CONFLICTING DATA SOURCES

(71) Applicant: salesforce.com, inc., San Francisco, CA (US)

(72) Inventors: Matthew Fuchs, Los Gatos, CA (US); Stanislav Georgiev, Sunnyvale, CA (US); Mehmet Orun, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 210 days.

(21) Appl. No.: 14/074,475

(22) Filed: Nov. 7, 2013

(65) Prior Publication Data

US 2014/0289187 A1    Sep. 25, 2014

Related U.S. Application Data

(60) Provisional application No. 61/804,075, filed on Mar. 21, 2013.

(51) Int. Cl.
*G06F 17/00* (2006.01)
*G06F 17/30* (2006.01)

(52) U.S. Cl.
CPC .............. *G06F 17/30345* (2013.01)

(58) Field of Classification Search
CPC .... G06Q 10/10; G06Q 30/02; G06Q 30/0201; G06Q 10/06; G06Q 10/063; G06Q 30/0255
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

OTHER PUBLICATIONS

SABA, "Saba Announces Revolutionary Social Enterprise Platform," Press Release, Mar. 20, 2012, pp. 1-4, Redwood Shores, California.

*Primary Examiner* — Truong Vo
(74) *Attorney, Agent, or Firm* — Dergosits & Noah LLP; Todd A. Noah

(57) ABSTRACT

A system and method for evaluating claims from sources to update database records. A trust score is developed for each source. If a source submits a claim, the trust score for that source and the value of the claim are evaluated against prior conflicting claims. If the current claim is deemed the most likely, then it is adopted as provisional "truth". If not, the current claim is rejected.

17 Claims, 10 Drawing Sheets

(56) References Cited

U.S. PATENT DOCUMENTS

| | | |
|---|---|---|
| 6,216,133 B1 | 4/2001 | Masthoff et al. |
| 6,216,135 B1 | 4/2001 | Brodersen et al. |
| 6,233,617 B1 | 5/2001 | Rothwein et al. |
| 6,236,978 B1 | 5/2001 | Tuzhilin et al. |
| 6,266,669 B1 | 7/2001 | Brodersen et al. |
| 6,288,717 B1 | 9/2001 | Dunkle et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh |
| 7,406,501 B2 | 7/2008 | Szeto et al. |
| 7,412,455 B2 | 8/2008 | Dillon |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,747,648 B1 | 6/2010 | Kraft et al. |
| 7,827,208 B2 | 11/2010 | Bosworth et al. |
| 7,945,653 B2 | 5/2011 | Zuckerberg et al. |
| 8,005,896 B2 | 8/2011 | Cheah et al. |
| 8,010,663 B2 | 8/2011 | Firminger et al. |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,103,611 B2 | 1/2012 | Tuzhilin et al. |
| 8,150,913 B2 | 4/2012 | Cheah et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0192880 A1* | 7/2009 | Hood .................. G06Q 30/0282 705/347 |
| 2010/0115040 A1* | 5/2010 | Sargent et al. ............... 709/206 |
| 2011/0265162 A1* | 10/2011 | Alavandar ............. G06Q 99/00 726/7 |
| 2012/0284090 A1* | 11/2012 | Marins ............... G06Q 10/0631 705/7.39 |

* cited by examiner

| | | | | |
|---|---|---|---|---|
| r1 | [first_name, Robert] | [last_name, Doe] | [title, Vice-President, Sales] | • • • |
| r2 | [first_name, George] | [last_name, Smith] | [title, Vice-President, Engineering] | • • • |
| r3 | [first_name, Jack] | [last_name, Daniel] | [title, Vice-President, Legal] | • • • |
| | • | • | • | |
| | • | • | • | |
| | • | • | • | |

400

SYSTEM AND METHOD FOR EVALUATING CLAIMS TO UPDATE A RECORD FROM CONFLICTING DATA SOURCES

CLAIM OF PRIORITY

This application claims priority from U.S. Provisional Patent App. No. 61/804,075 entitled System and Method for Discovering a Truth Entity from Conflicting Data Sources in a Multi-Tenant Environment, filed Mar. 21, 2013, which is incorporated herein by reference.

COPYRIGHT NOTICE

Portions of this disclosure contain material which is subject to copyright protection. The copyright owner has no objection to the facsimile reproduction by anyone of the patent document or the patent disclosure, as it appears in the records of the United States Patent and Trademark Office, but otherwise reserves all rights.

TECHNICAL FIELD

This disclosure relates generally to systems, computer program products, and computer methods for managing database records, and more particularly, for evaluating claims to update database records, including claims from multiple conflicting sources.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter discussed in the background section merely represents different approaches to database management issues, which may be unique on their own.

In conventional database systems, users access data resources from a single logical database. Typically, data is retrieved from and stored to the database using the computing systems or devices of the user. For example, a user system might remotely access one of a plurality of servers that might in turn access the database. The user may issue a query to the database in order to retrieve data. The database processes the query and returns to the user information from the database that is relevant to the query. The maintenance of the database in order to retrieve and deliver accurate information to the user in a timely and efficient manner has been and continues to be a goal of administrators of database systems.

In a multi-tenant database system ("MTS"), various elements of hardware and software of the database may be shared by one or more customers through "cloud computing" solutions which allow service providers to offer access to hardware/software systems through a network, such as the Internet. For example, an application server may be configured to simultaneously process multiple requests for many different customers, and a database may be configured to store data that is shared by many different customers.

Of course, customers of database systems demand that the data they purchase be comprehensive and accurate. An ongoing business enterprise typically maintains significant amounts of data in a database related to the company's business, including information pertinent to sales, revenue, costs, business opportunities, inventory, networking, etc. As one example, electronic business cards or contacts are the lifeblood of many organizations, and the contact information can be maintained in the database. However, keeping contacts or any other information current in a database can be tedious, particularly when the information changes from time to time. For example, the database may have multiple business cards for the same individual, or errors in a business card for the individual.

A typical contact database allows users to enter changes directly to records, such as creating new records, updating existing records, and deleting old records. Of course, allowing direct access by users for changes can sometimes lead to mistakes in the record. In addition, changes may be made by many different sources, and this can lead to conflicting data. Further, it is difficult for the database to easily ascertain the "truth" with regard to a particular database record, such as a business card, or any of its fields or properties. In fact, the best verification that a contact is accurate is the lack of complaint or feedback that the contact was wrong in some respect after a customer purchases the contact.

It would thus be desirable to provide improved systems and methods that permit the database to be updated only when the source of the update has sufficiently trustworthiness.

BRIEF DESCRIPTION OF THE DRAWINGS

In the following drawings, like reference numbers are used to refer to like elements. Although the following figures depict various examples, the one or more implementations are not limited to the examples depicted in the figures.

DETAILED DESCRIPTION

1. Overview

This disclosure describes systems and methods for receiving a request from a source to update a database record, including creating or deleting the record. The request or "claim" can be accepted solely based on the trust level associated with the source of the claim, or in combination with other relevant factors. For example, updates affecting a record are only made if the trust score of the source exceeds a threshold. Further, if multiple claims are made against the same record, the claim of the source with the highest trust score will be accepted so long as the trust score of the source exceeds a threshold, or multiple sources make the same claim.

2. Hardware/Software Environment

In general, the methods described herein may be implemented as software routines forming part of a database system. As used herein, the term multi-tenant database system refers to those systems in which various elements of hardware and software of the database system may be shared by one or more customers. For example, an application server may simultaneously process requests for a large number of customers, and a database table may store rows of data for a potentially much larger number of customers. As used herein, the term query refers to a set of steps used to access information in a database system.

Figure 1:
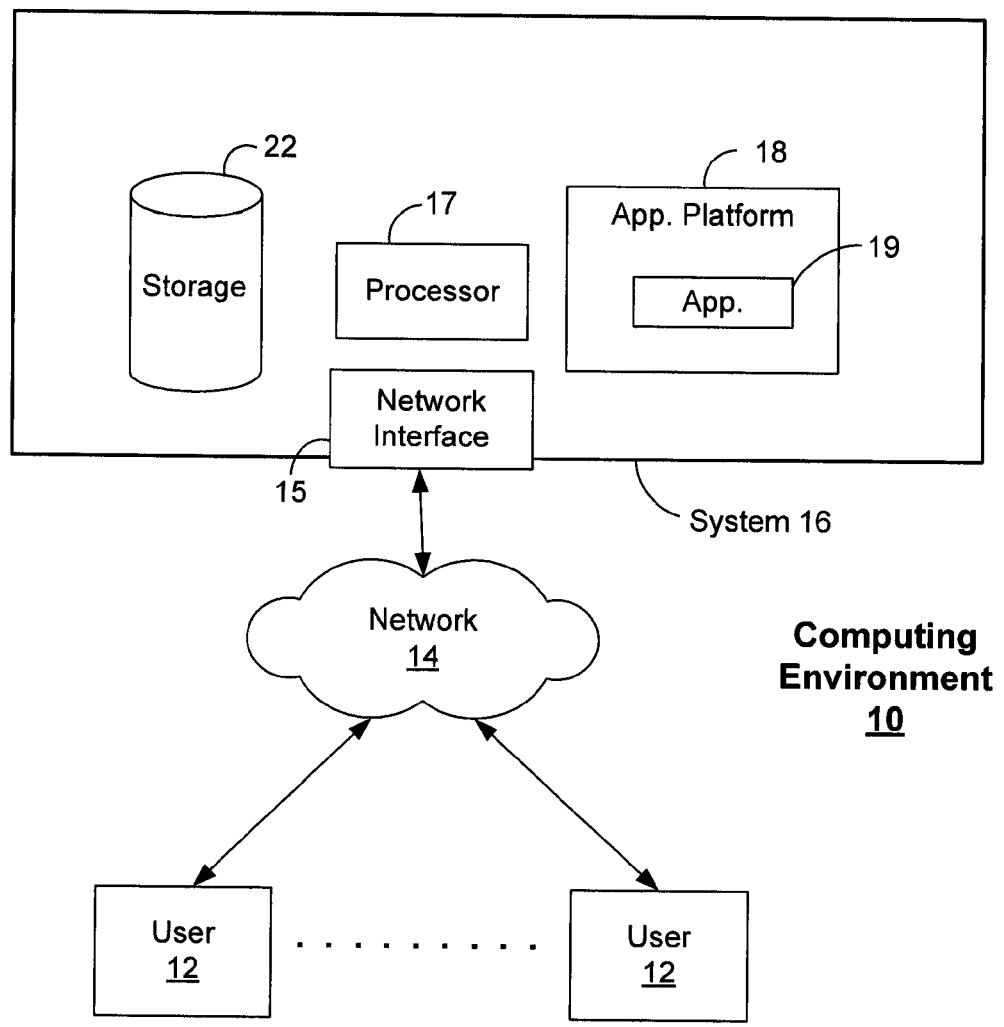
FIG. 1 is a simplified block diagram illustrating an embodiment using an on-demand database system.
Figure 2A:
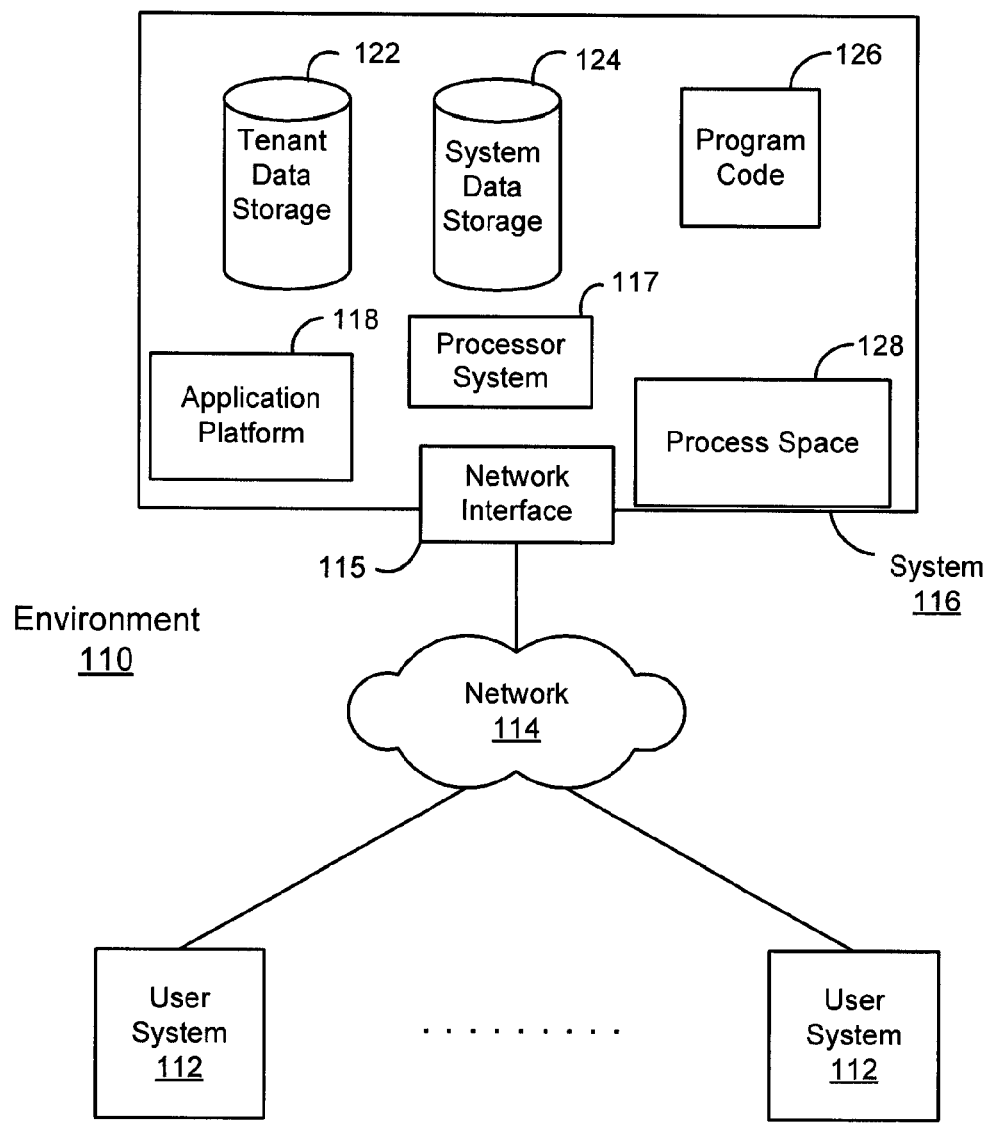
FIG. 2A illustrates a block diagram of an example environment for an on-demand multi-tenant database ("MTS") service.
Figure 2B:
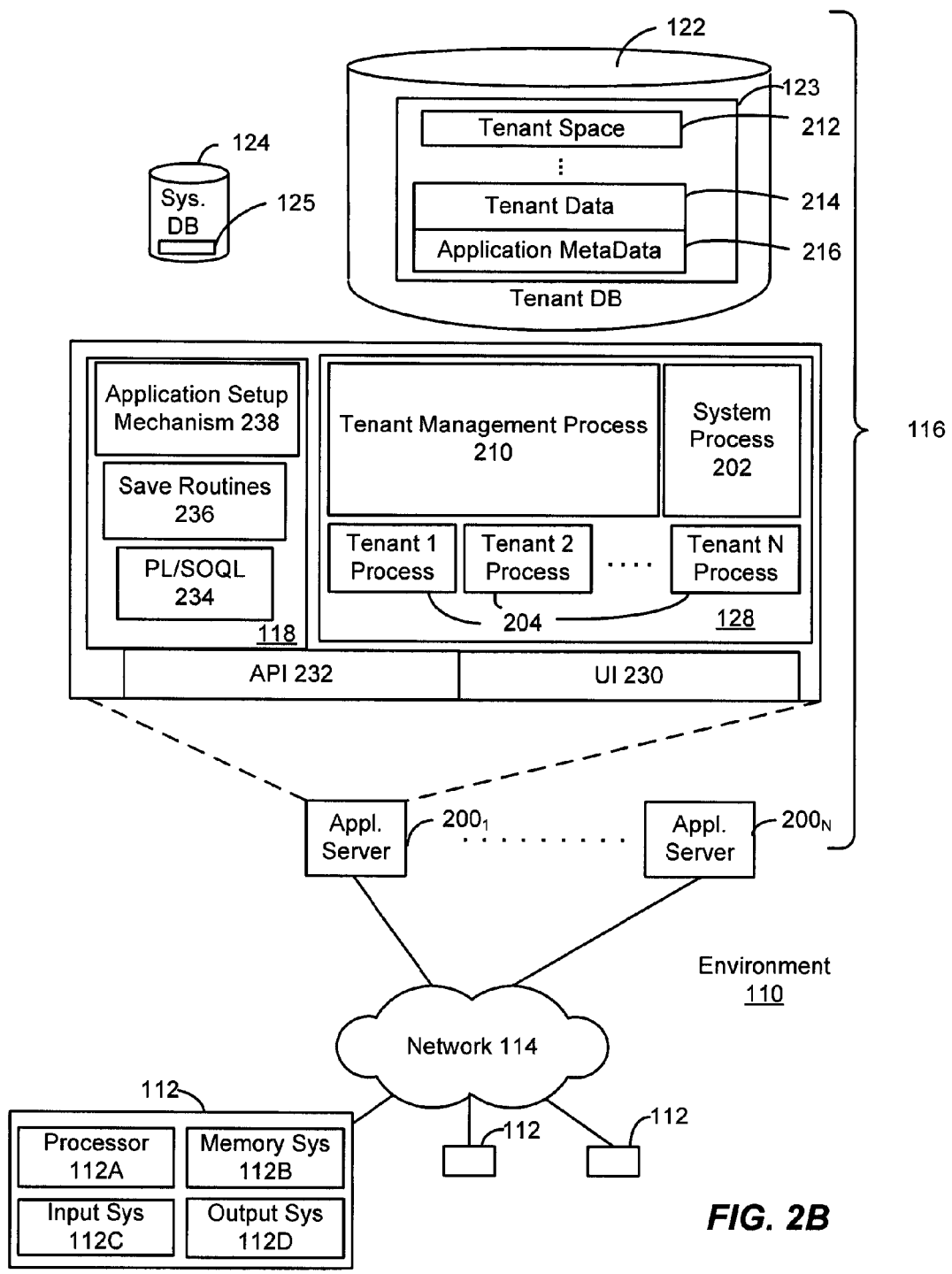
FIG. 2B illustrates a block diagram of an embodiment of elements of FIG. 2A and various possible interconnections between those elements.

FIG. 1 is a simplified block diagram illustrating one embodiment of an on-demand database system 16 operating in a computing environment 10. User devices or systems 12 access and communicate with the on-demand database system 16 through network 14 in a known manner. While the methods described herein may be implemented using any type of on-demand database system, the following discussion will describe an implementation of the method using an on-demand multi-tenant database system. More detailed examples for implementing an on-demand multi-tenant database system 116 are shown in FIGS. 2A and 2B, described at the end of this Detailed Description. User devices 12 may be any type of processor-based computing device, such as a desktop, laptop, tablet, smartphone, etc. Network 14 may be any type of processor-based computing network, such as the Internet, local area network ("LAN"), wide area network ("WAN"), etc.

The operation of on-demand database system 16 is controlled by a central processor system 17, and network interface 15 manages inbound and outbound communications between the network 14 and the on-demand database system 16. One or more applications 19 are managed and operated by the on-demand database system 16 through application platform 18. For example, a database management application runs on application platform 18 and provides program instructions executed by the processor 17 for indexing, accessing, updating and storing information for the database. In addition, a number of methods are described herein which may be incorporated, preferably as software routines, into the database management application for receiving and handling claims that a record should be updated.

The on-demand database system 16 provides user systems 12 with managed access to many features and applications available on or through the on-demand database system 16. For example, the on-demand database system 16 provides access to tenant data storage 22, which is configured through the on-demand database system 16 to maintain tenant data for multiple users/tenants. Tenant data storage 22 may be physically incorporated within the on-demand database system 16, or configured as remote storage (not shown), likewise accessible and useful to the on-demand database system 16 to support user systems 12. The on-demand database system 16 is designed to facilitate storage and organized access for many different types of tenant data.

3. Database Records

A database is a collection of objects, such as a set of logical tables, containing data that is organized into defined categories. The objects are typically accessible through an application programming interface (API), which is provided through a software application, for example, a customer relationship management (CRM) software product, such as those offered by Salesforce.com, of San Francisco, Calif. A table is one representation of a data object, and is used herein to simplify the conceptual description of objects, but should not be considered limiting. The terms "table" and "object" may be used interchangeably herein. Each table generally contains one or more data categories logically arranged as columns or fields or properties according to a defined schema. Each row of the table is a record containing an instance of data for each category defined by the fields.

Figure 3:
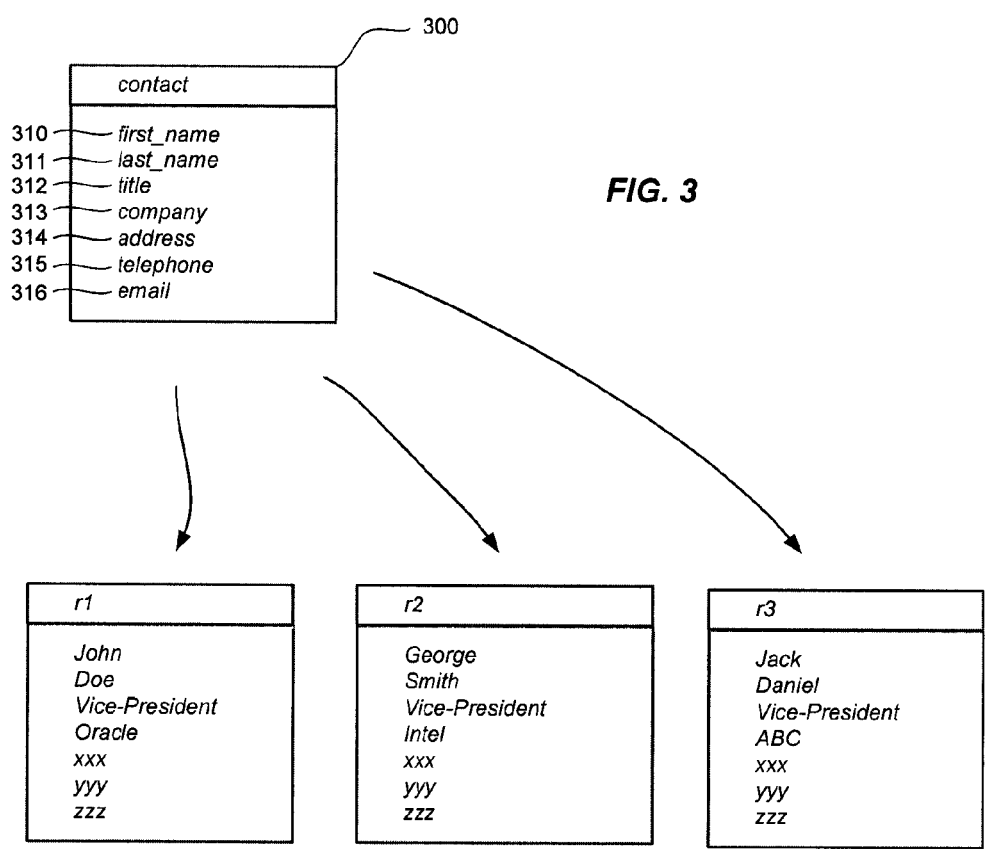
FIG. 3 is a block diagram illustrating a schema for a business contact and several records created according to the schema.

In a typical example, a database such as on-demand database system 16 stores and provides access to records containing the information of one or more organizations. Each record, also called an entity, includes multiple fields or properties. For example, FIG. 3 shows a representation for a typical schema 300 for a database record called contact, which includes a number of predefined fields or properties, including a first_name field 310, a last_name field 311, a title field 312, a company field 313, a company_address field 314, a telephone field 315, an email field 316, and so forth. The fields shown and described are merely illustrative since a database record and its schema could be constructed in many ways for many different applications with different numbers of fields or properties. Individual data records r1, r2 and r3, for example, are created according to the schema 300 and each record represents a business card or contact for a single individual having values for the predefined fields, some of which are shown.

Figure 4:
FIG. 4 is an example of a data table storing the records shown in FIG. 3.

FIG. 4 illustrates one embodiment of a table 400, where entities r1, r2, r3 are actually stored as separate rows in the table organized in accord with schema 300, each row being a collection of name/value pairs. For example, row r1 includes the data pairs: [first_name, "Robert"]; [last_name, "Doe"]; [title, "Vice-President, Sales"]; etc.; row r2 includes the data pairs [first_name, "George"]; [last_name, "Smith"]; [title, "Vice-President, Engineering"]; etc.; and row r3 includes the data pairs [first_name, "Jack"]; [last_name, "Daniels"]; [title, "Vice-President, Legal"].

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, all custom entity data rows are stored in a single multi-tenant physical table, which may contain multiple logical tables per organization. It is transparent to customers that their multiple "tables" are in fact stored in one large table or that their data may be stored in the same table as the data of other customers.

Database access is typically secure such that users may only access objects for which they have authorization, as determined by the organization configuration, user permissions and access settings, data sharing model, and/or other factors related specifically to the system and its objects. For example, users of the database can subscribe to one or more objects on the database in order to access, create and update records related to the objects.

The nature of a multi-tenant database, and in particular, the use of a crowd-sourcing approach for populating contact data, can lead to conflicting claims about the accuracy of stored data. For example, the stored business card r1 may have originally listed a first name as "Bob" when created by a first user, but was updated by a second user who claimed that the first name was actually "Robert." Another update offered by a third user claimed that the name was actually just "Rob" and not "Robert." The database has no way to know which update is correct. However, as described herein, the database can implement software tools to help evaluate these claims upon receipt and to determine the most likely true value for an entity or its properties.

4. Application for Handling Change Requests

An important objective for the administrator of MTS 16 is to maintain accurate, up-to-date, and detailed information in the database. For example, for a database that stores contact data, a user/customer may report errors in the data via a report to the database administrator, or alternatively, may attempt to directly update a contact record. A unique feature of the system and methods described herein is one or more applications 19, managed and operated by the MTS through its application platform 18, that facilitate this objective by providing one or more sets of program instructions that generate tools and features to help maintain and secure the accuracy and reliability of the stored data, as well as enhance the data where possible. For example, in one embodiment described herein, instructions are provided for receiving one or more "claims" from users regarding a contact record that needs to be updated.

Figure 5:
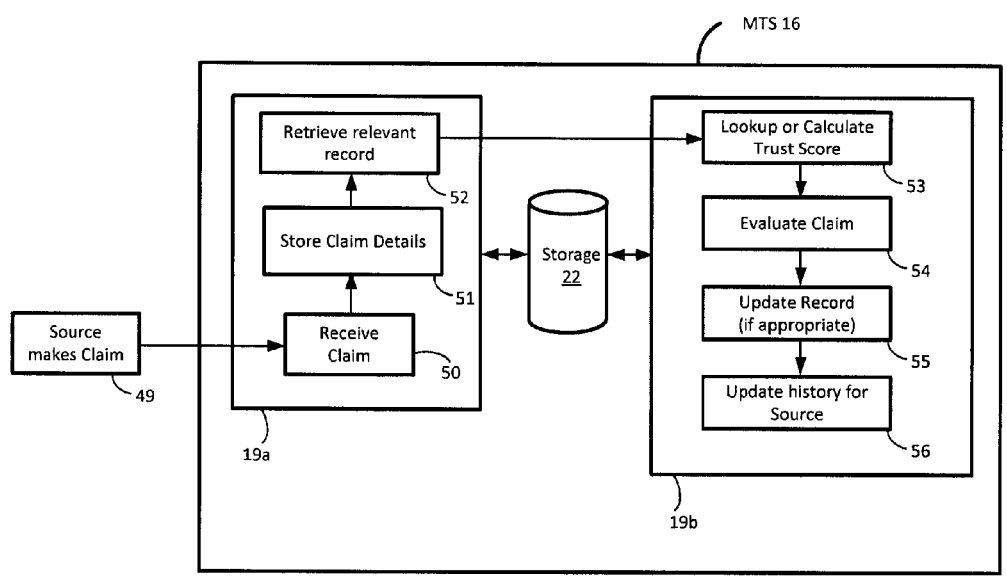
FIG. 5 is a block diagram illustrating the operational flow caused by program instructions for receiving and handling claims to update a record.

The block diagram shown in FIG. 5 illustrates one embodiment of an application 19*a* that performs initial handling and simple pre-processing steps, and a corresponding application 19*b*, which handles the main analysis and processing steps for a claim to update or delete a record. Although the two applications 19*a* and 19*b* are shown as part of MTS 16, these applications may implemented as integrated or discrete parts or modules, and may also be located elsewhere, but accessible to the MTS. Also, the construction of suitable program code and interaction between different code modules can vary greatly according to need and/or desire and software platform, and thus the illustrated embodiments are not intended to limit how various software solutions may be implemented.

In pre-processing application 19*a*, a first program module 50 has program code suitable to receive a claim from a source 49, such as a user 12 of MTS 16. A second program module 51 stores the details of the claim in storage 22. A third program module 52 retrieves the relevant record for processing.

In processing application 19*b*, a first program module 53 obtains the trust score for the user that made the claim, either by looking up the trust score, or, if the user has no history of making changes, calculating a new trust score for this user. A second program module 54 evaluates the claim in light the trust score and other factors, such as internal consistency of the claim. A third program module 55 updates the record if the evaluation determines that the user is a trusted source, and it would be appropriate to update the record. A fourth program module 56 updates (or creates) the history for this user.

5. Process for Handling Record Change Requests

Figure 6:
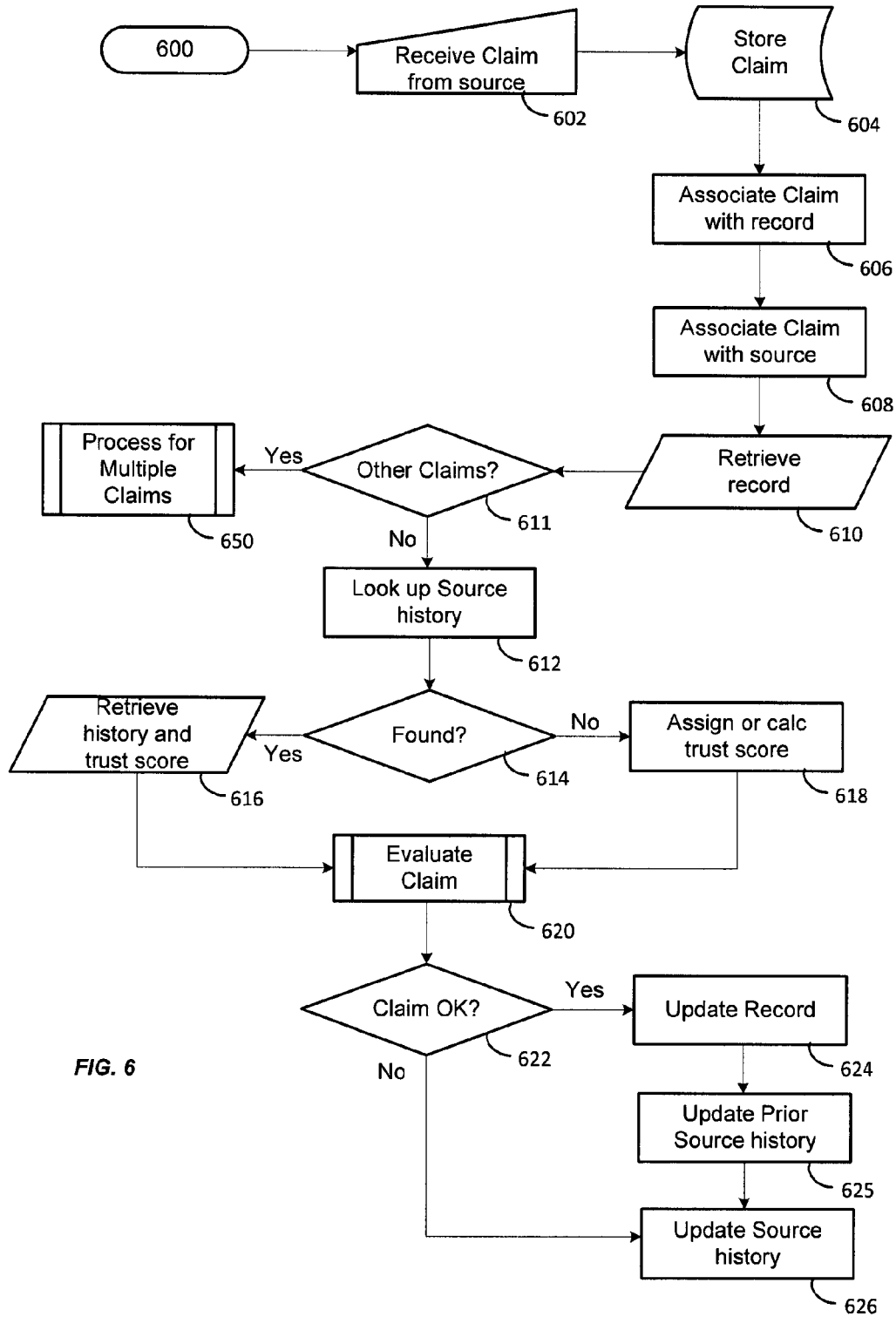
FIG. 6 is a flow chart illustrating one embodiment of a process for receiving and handling claims to update a record.

Referring now FIG. 6, a process 600 is illustrated for receiving and handling claims to update records. In step 602, a claim is initiated by a source, and in step 604, the details of the claim are stored in the database. The claim details should include at least (i) the relevant data record; (ii) the claimed true value of one or more properties of the record; (iii) the source of the claim; (iv) when the claim was made; (v) other claims made against this record; and any other relevant details.

Typically, the source will be a subscribed user of the database, but claims could also originate from other sources. For example, the database may employ its own search and verification techniques which generate update claims, or may receive reports from outside services, such as bounce reports from email services, which may generate update claims. Ideally, all sources would be reliable and trusted for all update claims. Unfortunately, that is generally not the case, as the reliability of sources or contributors of data varies. However, the accuracy of a source's claims can be tracked over time to provide one indication of the reliability and trustworthiness of the source.

In step 606, the claim is associated with the relevant record. In step 608, the claim is also associated with the source. Typically, the claim may be stored as part of the data record or the user record, perhaps as metadata, or as a link to a separate record, or in any other known manner.

In step 610, the relevant record is retrieved from storage. The present state of the record also reflects a claim as to the truth and accuracy of its contents, whether presented by the original source, or later updated, and thus the present claim includes a trust score as well. If there are other claims or relevant links, they would be discovered here, and step 611 is used to determine whether there are any other claims associated with this record. If so, the claim will be handled by process 650, described with reference to FIG. 7 below. If not, then in step 612, the source is looked up to see if there is a history and trust score for the source in storage related to other claims by this source for updates. Step 614 determines whether a history and trust score was found in step 612, and if so, then the history and trust score for this source are retrieved from storage in step 616 and used along with other factors to evaluate the claim against defined criteria in step 620. If step 614 determines that that there is no history or trust score, then a trust score will be assigned or calculated for this source in step 618.

The calculation of a score to measure the reliability or trustworthiness of individual sources or contributors can be accomplished in many ways, from a simple manual scoring, to a computer-implemented solution whereby simple or complex scoring algorithms can be processed for multiple data inputs to arrive at a score.

In a simple manual scoring solution, a database administrator could be used to assign scores, but such as solution may be impractical given the amount of data and number of updates that can occur. In one embodiment, an automated scoring solution is applied, but manual intervention by the database administrator may be appropriate to resolve disputes or to review scoring decisions.

Table I below represents a classic schema for manual scoring the reliability of a human intelligence source, and Table II represents a schema for manual scoring the reliability of the content or information provided by the source. For example, a score of "A1" would indicate a reliable source has provided confirmed data, while a score of "E5" would indicate an unreliable source has provided improbable data.

TABLE I

RELIABILITY OF SOURCE

| Rating | Category | Description |
|---|---|---|
| A | Reliable | No doubt of authenticity, trustworthiness, or competency; has a history of complete reliability |
| B | Usually Reliable | Minor doubt about authenticity, trustworthiness, or competency; has a history of valid information most of the time |
| C | Fairly Reliable | Doubt of authenticity, trustworthiness, or competency but has provided valid information in the past |
| D | Not Usually Reliable | Significant doubt about authenticity, trustworthiness, or competency but has provided valid information in the past |
| E | Unreliable | Lacking in authenticity, trustworthiness, and competency; history of invalid information |
| F | Cannot Be Judged | No basis exists for evaluating the reliability of the source |

TABLE II

RELIABILITY OF INFORMATION

| Rating | Category | Description |
|---|---|---|
| 1 | Confirmed | Confirmed by other independent sources; logical in itself; Consistent with other information on the subject |
| 2 | Probably True | Not confirmed; logical in itself; consistent with other information on the subject |
| 3 | Possibly True | Not confirmed; reasonably logical in itself; agrees with some other information on the subject |
| 4 | Doubtfully True | Not confirmed; possible but not logical; no other information on the subject |
| 5 | Improbable | Not confirmed; not logical in itself; contradicted by other information on the subject |
| 6 | Cannot Be Judged | No basis exists for evaluating the validity of the information |

The schemas shown in Tables I and II can be readily adapted to a machine solution by those with suitable programming skills. In one embodiment of a machine solution, the scoring is not limited to a discrete set of values as shown in Tables I and II, but instead, a numerical value between 0 and 1 is assigned or calculated as trust scores for a users and claims. Thus, a value of 1 would represent 100% trust and confidence in either the source or the claim, whereas a value of 0 would represent 0% trust and confidence in either the source or the claim.

There are also existing machine solutions and web services that implement different algorithms for scoring sources or contributors. For example, CrowdFlower <https://crowdflower.com> is a crowdsourcing service that has many vetted contributors, where the contributors are scored for their expertise, and customer tasks are assigned teams of appropriate contributors. Klout (<klout.com>) is a service that develops an influence score for contributors based on the content contributed and how people react to the content. In another embodiment, statistical methods could be employed to develop a scoring schema, for example, by applying a regression analysis to relevant factors, such as accuracy of prior claims, internal consistency of claim(s), number and score of other sources that agree with claim, etc. Finally, a panel of expert "super" users could be polled to provide a manual rating of sources.

Returning to FIG. 6, in step 620, the claim is evaluated, as shown in more detail in FIG. 8, described below. In step 622, if the evaluation determined that the claim is appropriate and correct, then in step 624, the record is updated including assigning a trust score for the accepted claim, now taken as truth for the record. In step 625, the history and trust score for the prior source of the record claim is updated. For example, since the claim of the prior source has now been discarded, the trust score of the prior source will be reduced. In step 626, the history for the current source is also updated to reflect that this claim resulted in the record being updated. For example, the fact that the claim was accepted can be used to improve the trust score of the current source. If the evaluation determines that the claim is not appropriate or correct in step 622, then the record is not updated, but the source history is still updated in step 626, and the trust score of the current source may be reduced. By this process, the trust scores of sources and claims can be continuously updated based on actual performance of the claims, i.e., whether claims were accepted or rejected.

Figure 7:
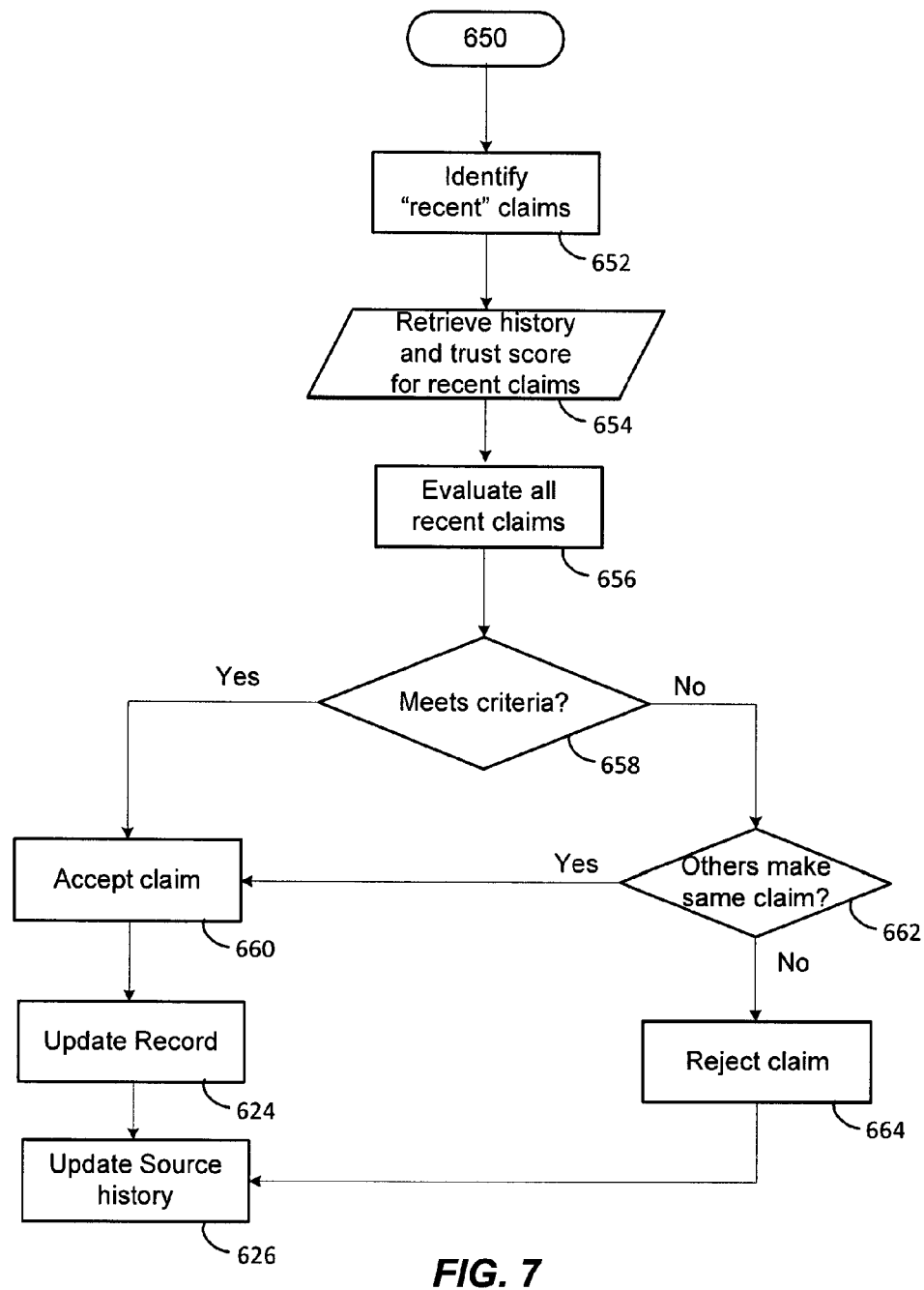
FIG. 7 is a flow chart illustrating one embodiment of a process for receiving and handling multiple claims to update a record.

Referring now to FIG. 7, a process 650 for handling multiple claims is illustrated. In step 652, a set of "recent" claims is identified. What constitutes a "recent" claim can be configured, but common time frames might be within the last 24 hours, or within the last week, or within the last month. At some point, a claim is no longer considered "recent" and will not be considered relative to a new claim.

In step 654, a trust score is obtained for the set of recent claims and the sources of the recent claims. In step 656, the set of recent claims are re-evaluated against each other and against the current claim. Factors relevant to the criteria for evaluation include: (i) how many sources assert the current claim versus different claims; (ii) what are the user trust scores for those sources asserting the current claim and for those sources asserting different claims; (iii) does the current claim fit with other relevant data, such as historical data including trends and/or patterns in the data; (iv) how old is the claim, etc. For example, email addresses that were created for individuals in a particular company with a specific domain, e.g., jigsaw.com, may be replaced with a new domain when the company is acquired, e.g., salesforce.com. Over some period of time, this trend becomes obvious, and the trust score for contacts in the domain salesforce.com can be increased while the trust score for contacts in the domainjigsaw.com can be decreased. In addition, the fact that salesforce.com acquired jigsaw.com can be discovered and considered accordingly.

Step 658 determines whether the evaluation meets the defined criteria for accepting a claim. In one example, if the source has a 75% trust score and the claim has a 75% trust score, then the criteria is satisfied. In another example, the criteria includes considering timing of the claims. For example, if there are two conflicting claims, one from a well-rated source but presented one year ago, and the other from two sources with slightly lower ratings but both presented within the last week, then the criteria may be defined to accept the more recent claim. If the acceptance criteria are satisfied, then the claim is accepted in step 660, the record is updated in step 624, and the history of all sources is updated in step 626.

If the acceptance criteria is not met in step 658, then step 662 determines whether other sources have made the same claim. If so, then the claim may be accepted in step 660. If not, then the claim is rejected in step 664, and the history of all sources is updated in step 626.

Figure 8:
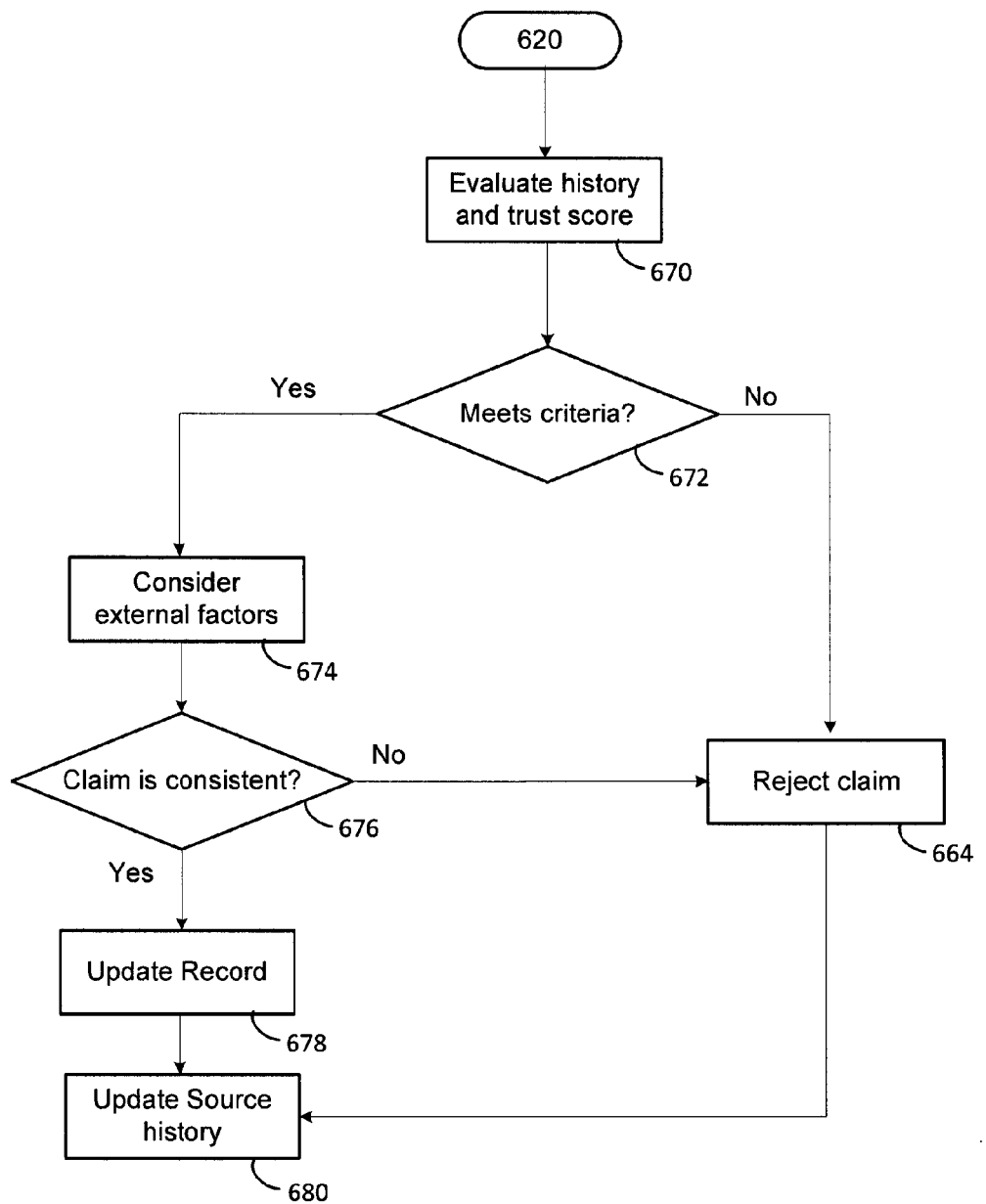
FIG. 8 is a flow chart illustrating one embodiment of a process for evaluating claims to update a record.

Referring now to FIG. 8, one embodiment of a process 620 for evaluating the claim is illustrated. In step 670, the history and trust score of the source are evaluated in light of the defined criteria. If the score meets defined criteria for acceptance in step 672, then external factors are considered in step 674, such as the internal consistency of the proposed update; nicknames or abbreviations for names or other fields; external searches to confirm data; etc. One external factor that may be weighted is the value of the record. That is, if the record is in high demand, e.g., is frequently purchased by subscribers, then the threshold for acceptance of a claim might be set higher than that for a less valuable record. If the claim is consistent with the external factors in step 676, then the record is updated in step 678 and the history for the source is updated in step 680. If the claim is not consistent with the external factors in step 676, then the claim is rejected in step 664, and the history for the source is updated in step 626.

Figure 9:
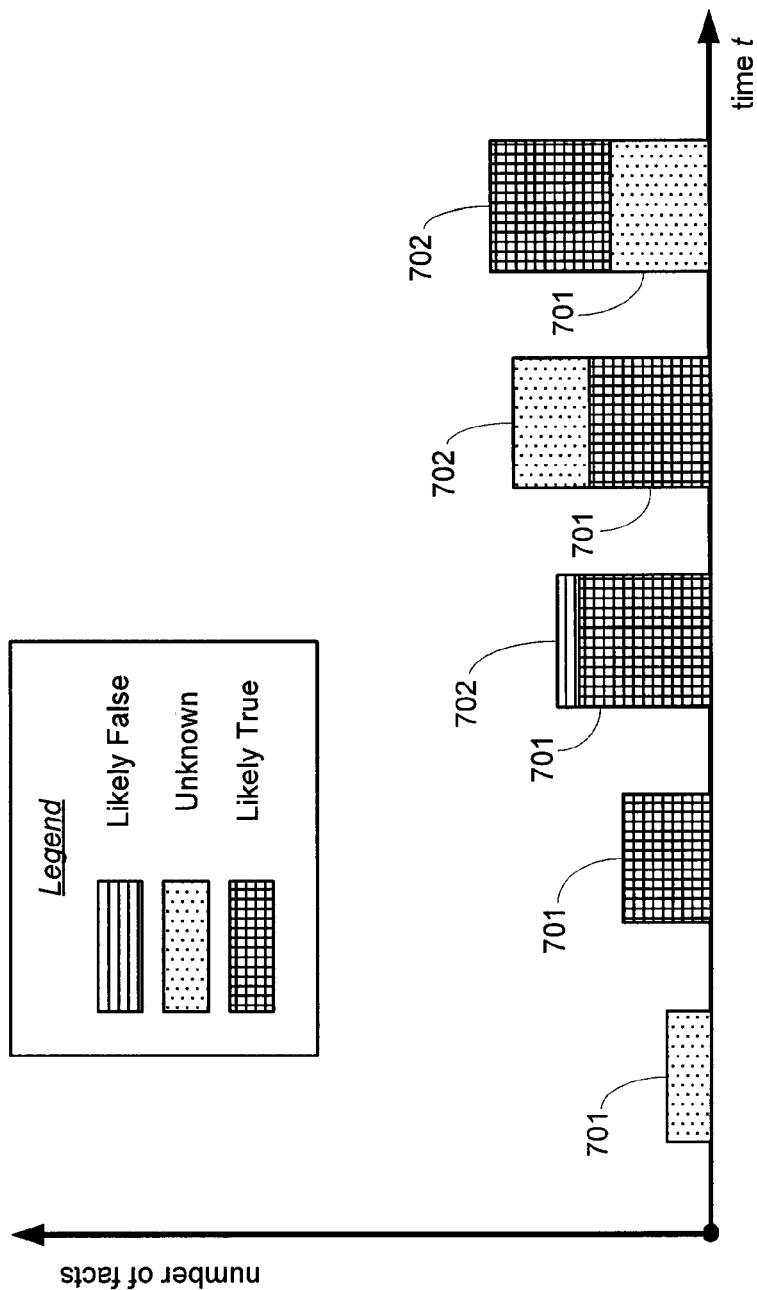
FIG. 9 is an example of a graph of the number of facts versus time for multiple claims affecting a record.

Referring to FIG. 9, a simple example of interpreting the quality of competing claims is illustrated. At time t=1, first claim 701 against a record is received by the system. Since few or no other facts support the claim at this time, the trustworthiness is assigned a status of UNKNOWN. By time t=2, additional facts have been collected that support the assertion in the first claim 700, and the status of the first claim is upgraded from UNKNOWN to LIKELY TRUE. The absence of any negative facts, e.g., the lack of complaints about the accuracy of the record, such as no bounce reports for purchased email accounts, can be taken as a fact to support the accuracy of the record. At time t=3, however, a second claim 702 is received against the record, for example, an email bounce report. Since the second claim 702 deviates from the first claim 701, and the second claim is supported by few or no other facts at this point, it is initially treated as suspect and assigned a status of LIKELY FALSE. However, mechanisms may be initiated either to gather evidence regarding the second claim 702, and/or to facilitate alerts regarding the new assertion. Thus, by time t=4, the second claim 702 has gathered additional support, and its status is upgraded from LIKELY FALSE to UNKNOWN. The first claim 701 is still considered more likely. At time t=5, the second claim 702 has gathered enough support to be considered the more highly trusted claim.

6. Detailed Database Embodiments

FIG. 2A is a block diagram of an exemplary environment 110 for use of an on-demand database service. Environment 110 may include user systems 112, network 114 and system 116. Further, the system 116 can include processor system 117, application platform 118, network interface 120, tenant data storage 122, system data storage 124, program code 126 and process space 128. In other embodiments, environment 110 may not have all of the components listed and/or may have other elements instead of, or in addition to, those listed above.

User system 112 may be any machine or system used to access a database user system. For example, any of the user systems 112 could be a handheld computing device, a mobile phone, a laptop computer, a work station, and/or a network of computing devices. As illustrated in FIG. 2A (and in more detail in FIG. 2B), user systems 112 might interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services may store information from one or more tenants into tables of a common database image to form a multi-tenant database system (MTS). Accordingly, the terms "on-demand database service 116" and "system 116" will be used interchangeably in this disclosure. A database image may include one or more database objects or entities. A database management system (DBMS) or the equivalent may execute storage and retrieval of information against the database objects or entities, whether the database is relational or graph-oriented. Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permission levels for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global network of networks often referred to as the Internet, that network will be used in many of the examples herein. However, it should be understood that the networks that the one or more implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a browser for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the data stored in the MTS; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, web pages and other information to and from user systems 112 and to store to, and retrieve from, a database system related data, objects, and Web page content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 2A, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 2A include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 2B also illustrates environment 110. However, in FIG. 2B elements of system 116 and various interconnections in an embodiment are further illustrated. FIG. 2B shows that user system 112 may include processor system 1110, memory system 1111, input system 112C, and output system 112D. FIG. 2B shows network 114 and system 116. FIG. 2B also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 2A. Regarding user system 112, processor system 1110 may be any combination of one or more processors. Memory system 1111 may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks.

As shown by FIG. 2B, system 116 may include a network interface 115 (of FIG. 2A) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases, or in distributed memory as described herein.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. A detailed description of some PL/SOQL language embodiments is discussed in U.S. Pat. No. 8,271,341, entitled Method And System For Governing Resource Consumption in a Multi-Tenant System, which is incorporated by reference herein. Invocations to applications may be detected by one or more system processes, which manages retrieving application metadata 216 for the subscriber making the invocation and executing the metadata as an application in a virtual machine.

Each application server 200 may be coupled for communications with database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, an interface system implementing a load balancing function (e.g., an F5 Big-IP load balancer) is coupled for communication between the application servers 200 and the user systems 112 to distribute requests to the application servers 200. In one embodiment, the load balancer uses a "least connections" algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant and handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be shared organization-wide or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for updating database records, comprising:
receiving, by a database system, a plurality of claims from a plurality of sources regarding a request from the plurality of sources to update one record of a plurality of records stored in the database, the record representing a corresponding entity having a plurality of corresponding properties;
obtaining, by the database system, a trust score for each of the plurality of sources that requests to update the record, each of the trust scores representing a reliability of a corresponding source based on an accuracy of previous claims received from the source;
evaluating, by the database system, the plurality of claims, the trust scores corresponding to the plurality of claims, and the at least one record for which the update is requested using a set of defined criteria for acceptance of the claims; and
updating, by the database system, the record in the database with one of the plurality of claims when the evaluation using the set of defined criteria for acceptance, determines that the one of the plurality of claims is more trustworthy than the record.

2. The method of claim 1, further comprising:
storing the one of the plurality of claims and associating it with the record.

3. The method of claim 2, further comprising:
storing the one of the plurality of claims and associating it with the corresponding source.

4. The method of claim 3, further comprising:
updating the trust score for each of the plurality of sources for each new claim made by each of the plurality of sources.

5. The method of claim 1,
wherein the trust score for each of the plurality of sources is determined as a function of a history of the previous claims made by the plurality of sources including a measure of accuracy of the claims made the plurality of sources.

6. The method of claim 1, further comprising:
analyzing additional factors related to the claims; and
updating the record in the database with one of the plurality of claims when the evaluation using the set of the defined criteria for acceptance determines that the one of the plurality of claims is more trustworthy than the record and that the additional factors support the claim.

7. The method of claim 6, wherein the additional factors include internal consistency of the claim.

8. The method of claim 1, further comprising:
when evaluation using the set of defined criteria determines that the plurality of claims are not more trustworthy than the record, then maintaining the record in the database.

9. The method of claim 1, further comprising:
maintaining a trust score for at least some of the plurality of records stored in the database including the record; and
updating the record to reflect the one of the plurality of claims when the trust score of the source corresponding to the one claim exceeds a trust score for the record.

10. A computer program product, comprising a non-transitory computer-readable medium having a computer-readable program code embodied therein to be executed by one or more processors, the program code including instructions to:
receive a plurality of claims from a plurality of sources regarding a request from the plurality of sources to update one record of a plurality of records stored in the database, the record representing a corresponding entity having a plurality of corresponding properties;
obtain a trust score for each of the plurality of sources that requests to update the record, each of the trust scores representing a reliability of a corresponding source based on an accuracy of previous claims received from the one source;
evaluate the plurality of claims, the trust scores corresponding to the plurality of claims, and the at least one record for which the update is requested using a set of defined criteria for acceptance of the claims; and
update the record in the database with one of the plurality of claims when the evaluation using the set of defined criteria for acceptance determines that the one of the plurality of claims is more trustworthy than the record.

11. The computer program product of claim 10, wherein the trust score for each of the plurality of sources is determined as a function of a history of the previous claims made by the plurality of sources including a measure of accuracy of the claims made by the plurality of sources.

12. The computer program product of claim 10, wherein the program code includes further instructions to:
analyze additional factors related to the claims;
update the record in the database with one of the plurality of claims when the evaluation using the set of the defined criteria determines that the one of the plurality of claims is more trustworthy than the record and that the additional factors support the claim.

13. The computer program product of claim 10, wherein the program code includes further instructions to:
maintain a trust score for at least some of the plurality of records stored in the database including the record; and
update the record to reflect the one of the plurality of claims when the trust score of the source corresponding to the one claim exceeds a trust score for the record.

14. A system for updating database records, the system comprising:
a processor-based application executed on a computer and configured to:
receive a plurality of claims from a plurality of sources regarding a request from the plurality of sources to update one record of a plurality of records stored in the database, the record representing a corresponding entity having a plurality of corresponding properties;
obtain a trust score for each of the plurality of sources that requests to update the record, each of the trust scores representing a reliability of a corresponding source based on an accuracy of previous claims received from the source;
evaluate the plurality of claims, the trust scores corresponding to the plurality of claims, and the at least one record for which the update is requested using a set of defined criteria for acceptance of the claims; and
update the record in the database with one of the plurality of claims when the evaluation using the set of defined criteria for acceptance determines that the one of the plurality of claims is more trustworthy than the record.

15. The system of claim 14, wherein
wherein the trust score for each of the plurality of sources is determined as a function of a history of the previous claims made by the plurality of sources including a measure of accuracy of the claims made by the plurality of sources.

16. The system of claim 14, wherein the processor-based application is further configured to:
analyze additional factors related to the claims; and
update the record in the database with one of the plurality of claims when the evaluation using the set of the defined criteria determines that the one of the plurality of claims is more trustworthy than the record and that the additional factors support the claim.

17. The system of claim 14, wherein the processor-based application is further configured to:
maintain a trust score for at least some of the plurality of records stored in the database including the record; and
update the record to reflect the one of the plurality of claims when the trust score of the source corresponding to the one claim exceeds a trust score for the first record.

* * * * *